(12) United States Patent
Matsui et al.

(10) Patent No.: US 11,635,921 B2
(45) Date of Patent: Apr. 25, 2023

(54) STORAGE ENVIRONMENT SELECTION BASED ON CHARACTERISTIC OF DATA AND CHARACTERISTIC OF STORAGE ENVIRONMENTS

(71) Applicant: Hitachi, Ltd., Tokyo (JP)

(72) Inventors: Iku Matsui, Tokyo (JP); Hiroshi Arakawa, Tokyo (JP); Hideo Tabuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/475,834

(22) Filed: Sep. 15, 2021

(65) Prior Publication Data
US 2022/0334748 A1    Oct. 20, 2022

(30) Foreign Application Priority Data

Apr. 19, 2021  (JP) .............................. JP2021-070562

(51) Int. Cl.
*G06F 3/06*  (2006.01)
(52) U.S. Cl.
CPC .............. *G06F 3/067* (2013.01); *G06F 3/061* (2013.01); *G06F 3/0655* (2013.01)

(58) Field of Classification Search
CPC ........ G06F 3/061; G06F 3/0655; G06F 3/067; G06F 3/0646–065
See application file for complete search history.

(56) References Cited

U.S. PATENT DOCUMENTS

| | | | |
|---|---|---|---|
| 2008/0052331 A1* | 2/2008 | Ogawa ................. | G06F 3/0605 |
| 2010/0199042 A1* | 8/2010 | Bates .................... | H04L 9/0625 |
| | | | 711/135 |
| 2015/0142950 A1* | 5/2015 | Anderson ............... | H04L 41/50 |
| | | | 709/224 |
| 2015/0172120 A1* | 6/2015 | Dwarampudi .......... | G06F 3/061 |
| | | | 709/221 |

FOREIGN PATENT DOCUMENTS

JP          2019-009610 A        1/2019

* cited by examiner

*Primary Examiner* — Chie Yew
(74) *Attorney, Agent, or Firm* — Volpe Koenig

(57) ABSTRACT

A data-storage-destination environment-determination module set determines any of a plurality of storage environments as a storage destination environment for storing data, based on a used-data table set about the characteristics of data and the storage environments. The data migration module transmits the data to the storage destination environment.

8 Claims, 23 Drawing Sheets

FIG. 4

| # | Item | Edge HCI storage | Mega cloud storage | Minor cloud storage | On-premise storage |
|---|---|---|---|---|---|
| 1 | Environment regulation | ·Company regulation<br>·Country regulation | ·Mega cloud regulation<br>·Country regulation<br>·Other country regulation | ·Minor cloud regulation<br>·Company regulation (custom)<br>·Country regulation | ·Company regulation<br>·Country regulation |
| 2 | Security level | Low | Medium | Medium | High |
| 3 | Corresponding storage format | ·Block<br>·File<br>·Object | ·Block<br>·File<br>·Object | ·Block<br>·File<br>·Object | ·Block<br>·File |
| 4 | Corresponding access pattern | ·Read<br>·Write | ·Read<br>·Write | ·Read<br>·Write | ·Read<br>·Write |
| 5 | Coordinated environment | Absent | ·Minor cloud storage | ·Mega cloud storage<br>·On-premise storage | ·Minor cloud storage |
| 5 | Accounting system | ·Storage cost: 5000 yen/1TB/month<br>·communication cost: no cost for data generated in edge | ·Storage cost: 2000 yen/1TB/month<br>·communication cost: 20 yen/1TB during reading, 10 yen/1TB during writing | ·Storage cost: 3000 yen/1TB/month<br>·communication cost: 10 yen/1TB during reading, 20 yen/1TB during writing | ·Storage cost: 5000 yen/1TB/month<br>·communication cost: 10 yen/1TB during reading, 10 yen/1TB during writing |

2111

211 Environment management table

FIG. 5

| # | Item | Configuration scan data | Shipping configuration data | Matching-confirmation result data |
|---|---|---|---|---|
| 1 | Data regulation | ·Company regulation<br>·Country regulation | ·Company regulation<br>·Country regulation | ·Company regulation<br>·Country regulation |
| 2 | Security level | Medium | High | Medium |
| 3 | Data storage format | ·Scan image: object<br>·Configuration list: file | ·Configuration list: file | ·Confirmation result (0/1): block |
| 4 | Corresponding operation | 1. Configuration scan<br>2. Matching confirmation of shipping configuration data and configuration scan data | 1. Identification of shipping configuration<br>2. Collection of necessary part<br>3. Matching confirmation of shipping configuration data and configuration scan data | 2. Matching confirmation of shipping configuration data and configuration scan data |
| 5 | Access frequency | 1. About 300 per month<br>2. About 300 per month | 1. About 300 per month<br>2. About 300 per month<br>3. About 300 per month | 2. About 300 per month |
| 6 | Access pattern | 1.Write<br>2.Read | 1.Write<br>2.Read<br>3.Read | 2.Write |
| 7 | Related data | 2. Shipping configuration data | 3. Configuration scan data | - |
| 8 | Coordination request | Present | Present | - |
| 9 | Related environment | 2. On-premise storage (task management system) | 3. Undetermined | - |
| 10 | Data size | 1000 MB | 100 MB | 10 MB |

2121 (column headers)

<u>212 Data management table</u>

FIG. 6

| # | Item | Identification of shipping configuration | Collection of necessary part | ... | Configuration scan | Matching confirmation of shipping configuration data and configuration scan data |
|---|---|---|---|---|---|---|
| 1 | Executor | Person X in charge | Person X in charge | | Person X in charge | Person X in charge |
| 2 | Execution condition | ·After reception of shipping instruction | ·Automatic execution after completion of identification of shipping configuration | | ·Execution instruction by executor on console after completion of automatic installation | ·Automatic execution after completion of configuration scan<br>·Presence of shipping configuration of data<br>·Presence of configuration scan data |
| 3 | Execution frequency | About ten per day | About ten per day | | About ten per day | About ten per day |
| 4 | Access data | 1. Order configuration data<br>2. Shipping configuration data | 1. Shipping configuration data<br>2. XXXX (e.g., stock data) | | 1. Configuration scan data | 1. Shipping configuration data<br>2. Configuration scan data |
| 5 | Access frequency | 1. About 300 per month<br>2. About 300 per month | 1. About 300 per month<br>1. About 300 per month | | 1. About 300 per month | 1. About 300 per month<br>2. About 300 per month |
| 6 | Access pattern | 1.Read<br>2.Write | 1.Read<br>2.Read | | 1.Write | 1.Read<br>2.Read |

213 Operation management table

FIG. 7

| # | Item | Regulation | Security | Performance | Coordination with other data | Cost |
|---|---|---|---|---|---|---|
| 1 | Necessity | Must | Must | Nice-to-Have | Nice-to-Have | Nice-to-Have |
| 2 | Specific gravity value | +0 | +0 | +10 | +5 | -1 |

221 Weighting table

FIG. 8

| # | Item | Cost |
|---|------|------|
| 1 | Threshold | 5 yen |

2221

222 Cost threshold table

FIG. 9

| Environment | Data | Conformity |
|---|---|---|
| Edge HCI storage | Configuration scan data | 1 |
| Mega cloud storage | | 1 |
| Minor cloud storage | | 0 |
| On-premise storage | | 1 |

2511 Regulation conformity table

| Environment | Data | Conformity |
|---|---|---|
| Edge HCI storage | Configuration scan data | 0 |
| Mega cloud storage | | 1 |
| Minor cloud storage | | 1 |
| On-premise storage | | 1 |

2512 Security conformity table

| Environment | Data | Conformity |
|---|---|---|
| Edge HCI storage | Configuration scan data | 1 |
| Mega cloud storage | | 1 |
| Minor cloud storage | | 1 |
| On-premise storage | | 0 |

2513 Performance conformity table

| Environment | Data | Conformity |
|---|---|---|
| Edge HCI storage | Configuration scan data | 0 |
| Mega cloud storage | | 0 |
| Minor cloud storage | | 1 |
| On-premise storage | | 1 |

2514 Relationship conformity table

251 Environment Conformity table

FIG. 10

| Environment | Data | Monthly cost (yen) |
|---|---|---|
| Edge HCI storage | Configuration scan data | 5 |
| Mega cloud storage | | 11 |
| Minor cloud storage | | 12 |
| On-premise storage | | 11 |

252 Cost table

FIG. 11

| Environment | Conformity | | | | Monthly cost (yen) |
|---|---|---|---|---|---|
| | Regulation | Security | Performance | Coordination | |
| Edge HCI storage | 1 | 0 | 1 | 0 | 5 |
| Mega cloud storage | 0 | 1 | 1 | 0 | 11 |
| On-premise storage | 1 | 1 | 0 | 1 | 11 |
| Minor cloud storage | 1 | 1 | 1 | 1 | 12 |

253 Conformity/cost table

FIG. 12

| Data | Storage destination environment |
|---|---|
| Configuration scan data | Minor cloud storage |

254 Data-storage-destination environment table

255 Policy-compliant state table

FIG. 14

| Data | Storage destination environment | Bottleneck | Storage processing |
|---|---|---|---|
| Configuration scan data | Minor cloud storage | Cost | Size reduction |

2561　2562　2563　2564

256 Storage processing table

STORAGE ENVIRONMENT SELECTION BASED ON CHARACTERISTIC OF DATA AND CHARACTERISTIC OF STORAGE ENVIRONMENTS

This application relates to and claims the benefit of priority from Japanese Patent Application No. 2021-070562 filed on Apr. 19, 2021 the entire disclosure of which is incorporated herein by reference.

BACKGROUND

The present disclosure relates to an information processor, a data control method, and a recording medium.

Conventionally, storage environments serving as IT (Information Technology) infrastructures in companies or the like are frequently integrated into a core such as an on-premise or cloud. In such a form, data generated in an edge is always transmitted to a core, and this may delay communications and increase communication costs, resulting from an increase in communications traffic.

To address the problem, Japanese Patent Application Publication No. 2019-9610 discloses an edge apparatus for efficiently transmitting data to a cloud. This edge apparatus determines whether data outputted from a terminal device is to be immediately transmitted to a server on the cloud, and then transmits, to the server, only the data determined to be immediately transmitted to the server.

SUMMARY

As a volume of data has increased and networks have advanced in recent years, a storage environment is provided as an IT infrastructure also for an edge, particularly, in a system where the IoT (Internet of Things) and OT (Operational Technology) are used. As an IT infrastructure installed for an edge, an HCI (Hyper-Converged Infrastructure) having characteristics, such as turnkey and small start properties, has been attracting attention. Furthermore, a system called a hybrid cloud or a multicloud is also used with a combination of a plurality of cores such as an on-premise and a cloud.

In a state where a plurality of such storage environments is present, the efficient use of each of the storage environments is not sufficiently examined. For example, a storage environment for an edge is frequently used only for a specific purpose, for example, the purpose of using (for example, analyzing) data generated in an edge or the purpose of temporarily storing data. Thus, the efficient use of a core and an edge is not sufficiently examined. Thus, the advantage of setting a storage environment for an edge is limited.

In the technique described in Japanese Patent Application Publication No. 2019-9610, only the timing of data transmission to a cloud is controlled, and the efficient use of multiple storage environments is not disclosed.

An object of the present disclosure is to provide an information processor capable of efficiently using a plurality of storage environments, a data control method and a recording medium.

An image processor according to an aspect of the present disclosure is an information processor coupled to a plurality of storage environments in which data can be stored, the information processor including a storage destination determination unit configured to determine, based on management information on the characteristics of the data and the storage environments, any of the storage environments as a storage destination environment for storing the data, and a data migration unit configured to transmit the data to the storage destination environment.

According to the present invention, a plurality of storage environments can be efficiently used.

BRIEF DESCRIPTION OF THE DRAWINGS

FIG. 4 illustrates an example of an environment management table;

FIG. 5 illustrates an example of a data management table;

FIG. 6 illustrates an example of an operation management table;

FIG. 7 illustrates an example of a weighting table;

FIG. 8 illustrates an example of a cost threshold table;

FIG. 9 illustrates an example of an environment conformity table;

FIG. 10 illustrates an example of a cost table;

FIG. 11 illustrates an example of a conformity/cost table;

FIG. 12 illustrates an example of a data-storage-destination environment table;

FIG. 14 illustrates an example of a storage processing table;

DETAILED DESCRIPTION OF THE EMBODIMENT

An embodiment of the present disclosure will be described below with reference to the accompanying drawings.

In the following explanation, an example of processing may be described with "program" serving as an actor. The program is executed by a processor (computer), so that predetermined processing is performed by optionally using at least one of a storage unit and an interface unit. Thus, the subject of processing may be the processor (or a computer or a computer system that includes the processor). Likewise, an example of processing may be described with a module serving as an actor, the module having specific functions in the program. The subject of processing may be a functional part implemented by a processor. Moreover, the program may be installed in a computer from a program source. The program source may be, for example, a program distribution server or a storage medium readable by a computer. In the following explanation, two or more programs may be implemented as one program or one program may be implemented as two or more programs. At least part of processing implemented by the program may be implemented by a hardware circuit (e.g., an ASIC (Application Specific Integrated Circuit)) or an FPGA (Field-Programmable Gate Array).

Although various kinds of information are described by using tables, the data structure of information is not limited to tables. In the explanation of identification information, expressions such as "identification information," "name," and "number" may be replaced with one another.

Figure 1:
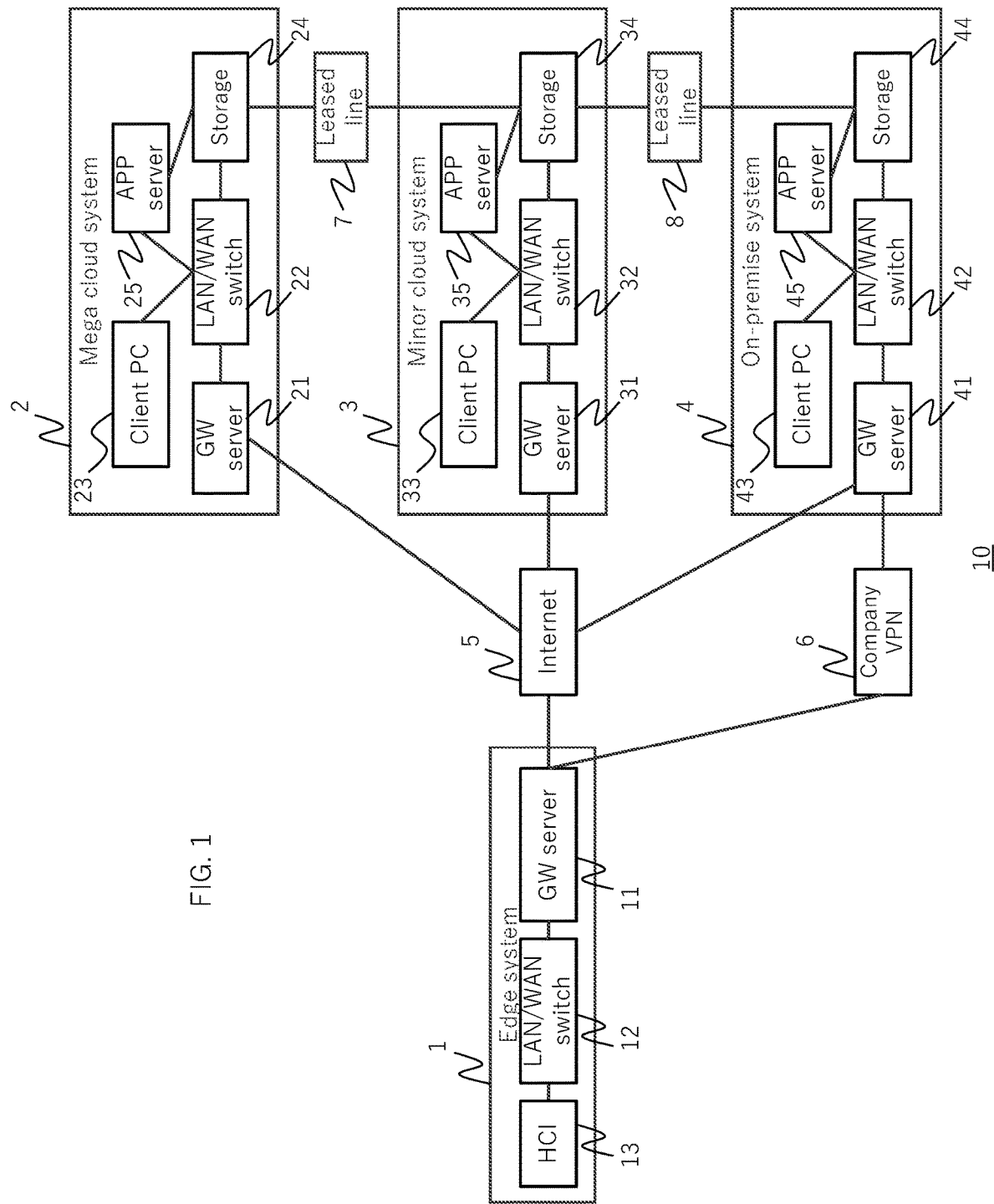
FIG. 1 illustrates a configuration example of an edge core system that is an information processor according to an embodiment of the present disclosure.

FIG. 1 illustrates a configuration example of an edge core system 10 that is an information processing system according to an embodiment of the present disclosure. The edge core system 10 in FIG. 1 includes an edge system 1, a mega cloud system 2, a minor cloud system 3, and an on-premise system 4. Hereinafter the edge system 1 may be referred to as an edge. Moreover, the mega cloud system 2, the minor cloud system 3, and the on-premise system 4 may be collectively referred to as core systems or cores. The core systems have different characteristics.

The edge system 1, the mega cloud system 2, the minor cloud system 3, and the on-premise system 4 are coupled to one another via an internet 5. The edge system 1 and the on-premise system 4 are coupled to each other via a company VPN (Virtual Private Network) 6, the mega cloud system 2 and the minor cloud system 3 are coupled to each other via a leased line 7, and the minor cloud system 3 and the on-premise system 4 are coupled to each other via a leased line 8. The kind and the number of core systems, a coupling configuration between the edge system 1 and the core systems, and a coupling configuration between the core systems are not limited to the example of FIG. 1.

The edge system 1 is an IT infrastructure that collects data from a device for generating data, for example, an OT device 14 (FIG. 2), which will be described later. The edge system 1 is disposed in, for example, a factory owned or managed by a company or a branch office. The edge system 1 includes a GW (Gateway) server 11, a LAN (Local Area Network)/WAN (Wide Area Network) switch 12, and an HCI 13.

The GW (Gateway) server 11 couples a WAN (not illustrated) in the edge system 1 and an external network (the internet 5 and the company VPN 6). The LAN/WAN switch 12 couples a LAN (not illustrated) and the WAN in the edge system 1. The HCI 13 collects and manages data generated in the edge system 1. The HCI 13 includes an HCI storage (described later) serving as a storage environment for storing data.

The mega cloud system 2 is a cloud system having a substantial global share. The mega cloud system 2 includes a GW server 21, a LAN/WAN switch 22, a client PC 23, a storage 24, and an APP server 25.

The GW server 21 couples a WAN (not illustrated) in the mega cloud system 2 and the external network (the internet 5 and the company VPN 6). The LAN/WAN switch 22 couples a LAN (not illustrated) and the WAN in the mega cloud system 2. The client PC 23 is a terminal used by an operator of the mega cloud system 2 and is used for the management and maintenance of the mega cloud system 2. The storage 24 stores data from the edge system 1. The APP server 25 controls the reading and writing of data from the edge system 1 into the storage 24.

The minor cloud system 3 is a cloud system provided for a specific area or a specific industry. The minor cloud system 3 includes a GW server 31, a LAN/WAN switch 32, a client PC 33, a storage 34, and an APP server 35. The configurations 31 to 35 of the minor cloud system 3 have the same functions as the configurations 21 to 25 denoted likewise in the mega cloud system 2.

The on-premise system 4 is a storage system owned as an asset of a company that manages the edge system 1. The on-premise system 4 includes a GW server 41, a LAN/WAN switch 42, a client PC 43, a storage 44, and an APP server 45. The configurations 41 to 45 of the on-premise system 4 have the same functions as the configurations 21 to 25 denoted likewise in the mega cloud system 2.

Figure 2:
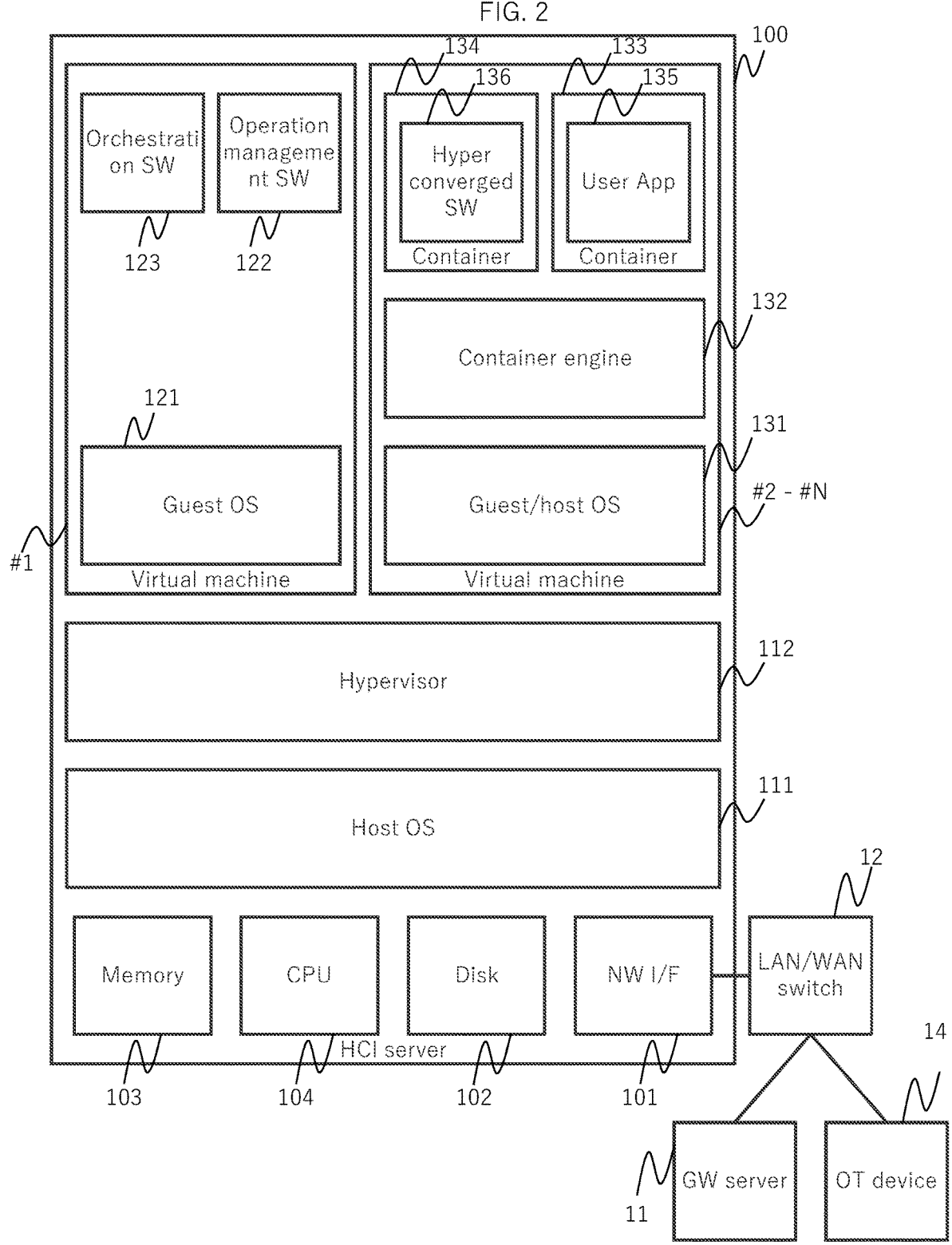
FIG. 2 is a block diagram illustrating a configuration example of an HCI.

FIG. 2 is a block diagram illustrating a configuration example of the HCI 13. In the example of FIG. 2, the HCI 13 is implemented by an HCI server 100 that is an information processing server.

The HCI server 100 includes, as physical resources, an NWI/F (Network Interface) 101, a disk 102, a memory 103, and a CPU (Central Processing Unit) 104.

The NWI/F (Network Interface) 101 is a communication unit for communications with the outside. In the example of FIG. 2, the NWI/F (Network Interface) 101 communicates with the outside of the edge system 1 via the LAN/WAN switch 12 and the GW server 11 and communicates with the OT device 14 via the LAN/WAN switch 12. The OT device 14 is a device for generating various types of data in the edge system 1. The OT device 14 is, for example, a device such as a crane installed in a factory. The device for generating data is not limited to the OT device 14. For example, devices such as a sensor device and an IoT (Internet of Things) device may be used instead.

The disk 102 is a recording apparatus that enables writing and reading of data and stores, for example, a program for determining the operation of the CPU 104. The disk 102 also functions as an edge HCI storage in which the NWI/F 101 stores data or the like received from the OT device 14. The memory 103 is a main memory unit that records information used by the CPU 104 and information generated by the CPU 104. At least part of information recorded in the memory 103 may be permanently stored in the disk 102. The memory 103 is used as a work area for the program.

The CPU 104 reads the program, which is recorded in the disk 102, into the memory 103 and executes the program by using the memory 103 so as to implement various functions. In the present embodiment, the CPU 104 executes a host OS 111 as a program and executes a hypervisor 112 as a control program for implementing a virtual machine on the host OS 111. The hypervisor 112 implements N virtual machines #1 to #N constituting the HCI 13.

The virtual machine #1 is a virtual machine for managing the HCI 13 while the virtual machines #2 to #N are used by a user. Since the virtual machines #2 to #N are identical in configuration, only one of the virtual machines is illustrated in FIG. 2.

The virtual machine #1 executes an operation management SW 122 and an orchestration SW 123 on a guest OS 121. The operation management SW 122 is software (program) for managing the HCI 13. The orchestration SW 123 is a program for managing coordination among storage environments in which data can be stored. The orchestration SW 123 has the function of determining a storage destination environment for actually storing data from among the storage environments and transmitting data to the storage destination environment. The storage environments in the present embodiment include an edge HCI storage that is the disk 102 in the edge system 1, a mega cloud storage that is the storage 24 in the mega cloud system 2, a minor cloud storage that is the storage 34 in the minor cloud system 3, and an on-premise storage that is the storage 44 in the on-premise system 4. Hereinafter, the storage environment may be simply referred to as an environment.

On the virtual machines #2 to #N, a container is created by a container engine 132 that operates on a guest/host OS 131. In the example of FIG. 2, containers 133 and 134 are created. The container 133 executes a user application program (user APP) 135. The user application program 135 issues, for example, a read/write request of data. The container 134 executes a hyper converged SW (Hyper converged SW) 136. The hyper converged SW 136 causes the disk 102 to also act as an edge HCI storage by using an SDS (Software-Defined Storage) technique.

The configuration illustrated in FIG. 2 is merely exemplary and thus the present disclosure is not limited to the configuration. For example, the HCI 13 is constructed using the virtual machines on the HCI server 100 that is a physical server. The HCI 13 may be constructed without using the virtual machines. Alternatively, on the virtual machines #2 to #N, no containers may be created.

Figure 3:
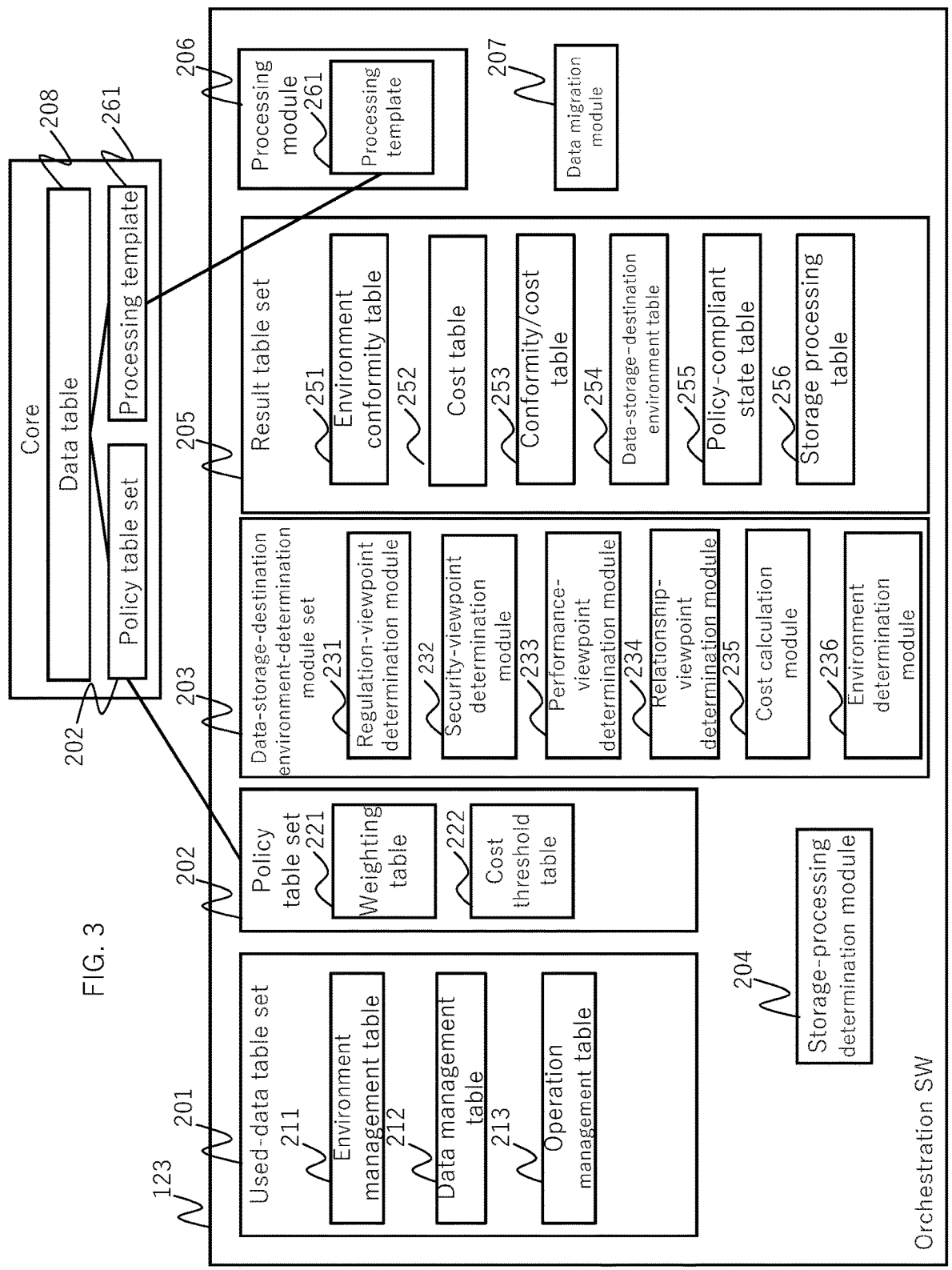
FIG. 3 illustrates a configuration example of an orchestration SW.

FIG. 3 illustrates a configuration example of the orchestration SW 123. As illustrated in FIG. 3, the orchestration SW 123 includes a used-data table set 201, a policy table set 202, a data-storage-destination environment-determination module set 203, a storage-processing determination module 204, a result table set 205, a processing module 206, and a data migration module 207.

Thus used-data table set 201 is management information on the characteristics of data and the storage environments and is used for determining a storage destination environment. Specifically, the used-data table set 201 includes an environment management table 211 (FIG. 4) indicating the characteristics of the storage environments, a data management table 212 (FIG. 5) indicating the characteristics of data, and an operation management table 213 (FIG. 6) indicating the characteristics of operations performed using data.

The policy table set 202 is information indicating a policy for determining the storage destination information of data. The policy table set 202 includes a weighting table 221 (FIG. 7) and a cost threshold table 222 (FIG. 8).

The data-storage-destination environment-determination module set 203 is a set of modules for implementing a storage-destination determination unit that determines any one of the storage environments as a storage destination environment based on the used-data table set 201 and the policy table set 202. In the present embodiment, from respective viewpoints, the data-storage-destination environment-determination module set 203 determines the conformity of the storage environments serving as data storage destinations and determines the storage destination environment based on the conformity from the viewpoints. The storage destination environment may be determined for each type of data.

The data-storage-destination environment-determination module set 203 includes a regulation-viewpoint determination module 231, a security-viewpoint determination module 232, a performance-viewpoint determination module 233, a relationship-viewpoint determination module 234, a cost calculation module 235, and an environment determination module 236.

Modules 231 to 235 are modules for determining the conformity of the storage environments from the respective viewpoints. Specifically, the regulation-viewpoint determination module 231 is a module for determining the conformity of the storage environments with respect to regulations (restrictions and rules) on data and environments. The security-viewpoint determination module 232 is a module for determining the conformity of the storage environments with respect to the security of data and storage environments. The performance-viewpoint determination module 233 is a module for determining the conformity of the storage environments with respect to performance on the data of the storage environments. The relationship-viewpoint determination module 234 is a module for determining the conformity of the storage environments with respect to the relationship between data. The cost calculation module 235 is a module for determining the conformity of the storage environments with respect to the cost of storing data in the storage environments. The regulation, security, performance, relationship, and cost indicate the respective viewpoints.

An environment determination module 236 is a module for determining the storage destination environment of data based on the conformity determined by the modules 231 to 235.

The storage-processing determination module 204 is a module for determining storage processing, which is data processing performed on data, when the data is transmitted to the storage destination environment determined by the environment determination module 236 and is stored therein. In the present embodiment, the storage-processing determination module 204 determines storage processing according to a bottleneck viewpoint for which conformity does not satisfy predetermined good conditions in the storage destination environment of data. The storage processing is data processing for improving conformity from a bottleneck viewpoint which is poor conformity. For example, if security is a bottleneck viewpoint, the storage processing is processing for improving security, for example, encryption.

The result table set 205 is information on determination results obtained by the modules 231 to 236 in the data-storage-destination environment-determination module set 203 and the storage-processing determination module 204. The result table set 205 includes an environment conformity table 251 (FIG. 9), a cost table 252 (FIG. 10), a conformity/cost table 253 (FIG. 11), a data-storage-destination environment table 254 (FIG. 12), a policy-compliant state table 255 (FIG. 13), and a storage processing table 256 (FIG. 14).

The environment conformity table 251 indicates conformity determined by the modules 231 to 234 in the data-storage-destination environment-determination module set 203. The cost table 252 indicates conformity determined by the cost calculation module 235. The conformity/cost table 253 is an organized table of the environment conformity table 251 and the cost table 252. The data-storage-destination environment table 254 indicates the storage destination environment of data. The policy-compliant state table 255 indicates a compliant state with the good conditions of conformity for the viewpoints in the storage destination environment. The storage processing table 256 indicates storage processing determined by the storage-processing determination module 204.

The processing module 206 is a module for performing the storage processing. The processing module 206 has a processing template 261 (FIG. 15) for determining the storage processing.

The data migration module 207 is a module for transmitting data, which is subjected to the storage processing, to the storage destination environment and storing the data therein.

In the foregoing configuration, the policy table set 202 and the processing template 261 are determined in any one of the cores (e.g., the on-premise system 4) and are optionally incorporated into the orchestration SW 123. At least part of the policy table set 202 and the processing template 261 may be determined in advance in an edge. Moreover, the core may hold a data table 208 indicating the history of processing results obtained by the orchestration SW 123.

FIG. 4 illustrates an example of the environment management table 211. The environment management table 211 in FIG. 4 includes the columns 2111 for storing, for the respective environments (storage environments), environment management information on the environments. The columns 2111 each have a plurality of fields for the items of environment information. The example of FIG. 4 indicates, as the items of the environment information, an environment regulation applied to an environment, an environment security level, a corresponding storage format for an environment, a corresponding access pattern for an environment, coordinated environments as other environments that enable direct access, and an accounting system of an environment.

The environment regulation is, for example, a regulation (company regulation) provided for a company (a company that manages an edge), a regulation (country regulation) set for a country where the company is located, or a regulation (mega-cloud regulation and minor-cloud regulation) configured for a provider of an environment. In the example of FIG. 4, the security level is configured at three levels: "low," "medium," and "high." The security level is not limited to this example. The access pattern indicates at least one of "Read" for reading data and "Write" for writing data. The other environments that enable direct access as coordinated environments are directly coupled to one another via a leased line (e.g., the leased line 7 or 8) without being coupled via a general-purpose network, e.g., the internet 5. In the present embodiment, the mega cloud storage and the minor cloud storage are coordinated environments while the minor cloud storage and the on-premise storage are coordinated environments.

The accounting system includes storage cost that is the accounting system of the storage and communication cost that is the accounting system of communications for reading and writing data. The storage cost indicates a monthly rate for 1 TB in the example of FIG. 4. For an edge HCI storage and an on-premise storage that are prepared by a company, a value to be used is obtained by dividing the price of the used storage (the disk 102 and the storage 44) for 1 TB by the guarantee period ("month") of the storage. The communication cost indicates the communication charge of 1 TB for each access pattern. For the on-premise storage, a value to be used is obtained by dividing the construction cost of the company VPN 6 by the amortization period ("month") of the company VPN 6. For the edge HCI storage, the communication cost is zero.

FIG. 5 illustrates an example of the data management table 212. The data management table 212 in FIG. 5 includes columns 2121 for storing, for each type of data, data information on the data. The columns 2121 each have a plurality of fields for the items of the data information. In the example of FIG. 5, "configuration scan data," "shipping configuration data," and "matching-confirmation result data" are indicated as types of data. Moreover, the example of FIG. 5 indicates, as the items of the data information, a data regulation applied to data, a data security level, a data storage format that is a storage format suitable for data, a corresponding operation that is an operation of access to data, the frequency of access to data, a pattern of access to data, related data that is another data accessed in the operation of access to data, a coordination request indicating the presence or absence of coordination between data and the related data, a related environment that is a storage destination environment of the related data, and a data size.

Multiple corresponding operations may be provided. In the case of multiple corresponding operations, the frequency of access, an access pattern, related data, relationship, and a related environment are configured for each of the operations. In FIG. 5, the types of data are denoted by the respective identification numbers "1." to "3." of the corresponding operations. If data and the related data are desirably stored in an environment that enables the same or direct access, a coordination request is present. Otherwise no coordination request is made (no data). A data size indicates the sum of the sizes of data generated in a month and may be calculated from past mean values.

FIG. 6 illustrates an example of the operation management table 213. The operation management table 213 in FIG. 6 includes columns 2131 for storing, for each operation of access to data, operation information on the operation. The columns 2131 each have a plurality of fields for the items of the operation information. The example of FIG. 6 indicates, as the items of the operation information, an executor in charge of an operation, an execution condition that is a condition for executing an operation, the frequency of executing an operation, access data that is data to be accessed in an operation, the frequency of access to the access data, and a pattern of access to the access data.

Multiple pieces of access data may be provided. In the case of multiple pieces of access data, the frequency of access and an access pattern are configured for each piece of the access data. In FIG. 6, operations are denoted by the respective identification numbers "1." and "2." of access data.

FIG. 7 illustrates an example of the weighting table 221. The weighting table 221 in FIG. 7 includes columns 2211 for storing, for respective viewpoints for determining conformity, policy information on the policies of the viewpoints. The columns 2211 each have a plurality of fields for the items of policy information. The example of FIG. 7 indicates, as the items of the policy information, necessity indicating whether the viewpoint needs to satisfy the predetermined conditions of conformity and a specific gravity value that is the weight value of the viewpoint. If the predetermined conditions are to be satisfied, the necessity indicates "Must." Otherwise the necessity indicates "Nice-to-Have." A specific gravity value is a weight value for calculating the weighting sum of best fits that are the values of conformity for the viewpoints. When the necessity is "Must," the specific gravity value is "0." Since cost is defined with conformity that decreases with an increase in best fit, the specific gravity value of cost has a negative value.

FIG. 8 illustrates an example of the cost threshold table 222. The cost threshold table 222 in FIG. 8 includes fields 2221 for storing a threshold serving as a goodness determination policy of cost.

FIG. 9 illustrates an example of the environment conformity table 251. The environment conformity table 251 includes a plurality of tables indicating, for the viewpoints for determining conformity, the conformity of the viewpoints. In the example of FIG. 9, the environment conformity table 251 includes a regulation conformity table 2511 that indicates conformity about a regulation, a security conformity table 2512 that indicates conformity about security, a performance conformity table 2513 that indicates conformity about performance, and a relationship conformity table 2514 that indicates conformity about a relationship.

Each of the tables 2511 to 2514 has fields 2515 to 2517. The field 2515 stores an environment name indicating an environment. The field 2516 stores a type name indicating the type of target data for which a storage destination environment is to be determined. The field 2517 stores, as conformity, a best fit that is a value corresponding to conformity. In the example of FIG. 9, target data is denoted as "configuration scan data." In the present embodiment, the presence or absence of conformity is determined from the viewpoints of a regulation, security, performance, and relationship. The field 2517 stores "1" as a best fit in the presence of conformity and stores "0" as a best fit in the absence of conformity.

FIG. 10 illustrates an example of the cost table 252. The cost table 252 in the environment of FIG. 10 is information indicating conformity about cost and includes fields 2521 to 2523. The field 2521 stores an environment name. The field 2522 stores a type name of target data. The field 2523 stores monthly cost, which is a cost for one month, as a best fit indicating conformity about cost. A method for calculating the monthly cost will be described later. The conformity about cost is not limited to monthly cost and thus may be yearly cost or daily cost.

FIG. 11 illustrates an example of the conformity/cost table 253. The conformity/cost table 253 in FIG. 11 includes fields 2531 and 2532. The field 2531 stores an environment name. The field 2532 stores conformity. Specifically, the field 2532 includes a field 2533 that stores conformity about a regulation, a field 2534 that stores conformity about security, a field 2535 that stores conformity about performance, a field 2536 that stores conformity about a relationship, and a field 2537 that stores monthly cost that is conformity about cost.

FIG. 12 illustrates an example of the data-storage-destination environment table 254. The data-storage-destination environment table 254 in FIG. 12 includes fields 2541 and 2542. The field 2541 stores a type name of target data. The field 2542 stores the environment name of the storage destination environment of target data.

Figure 13:
FIG. 13 illustrates an example of a policy-compliant state table.

FIG. 13 illustrates an example of the policy-compliant state table 255. The policy-compliant state table 255 in FIG. 13 includes fields 2551 and 2552. The field 2551 stores a viewpoint name of a viewpoint for determining conformity. The field 2552 stores a bottleneck determination result indicating whether a viewpoint is a bottleneck viewpoint. In the example of FIG. 13, if a viewpoint is a bottleneck viewpoint, the bottleneck determination result indicates "present." Otherwise the bottleneck determination result indicates "absent."

FIG. 14 illustrates an example of the storage processing table 256. The storage processing table 256 in FIG. 14 includes fields 2561 to 2564. The field 2561 stores a type name of target data. The field 2562 stores the environment name of a storage destination environment. The field 2563 stores bottleneck information indicating a bottleneck viewpoint. The field 2564 stores a storage processing name that is the processing name of storage processing.

Figure 15:
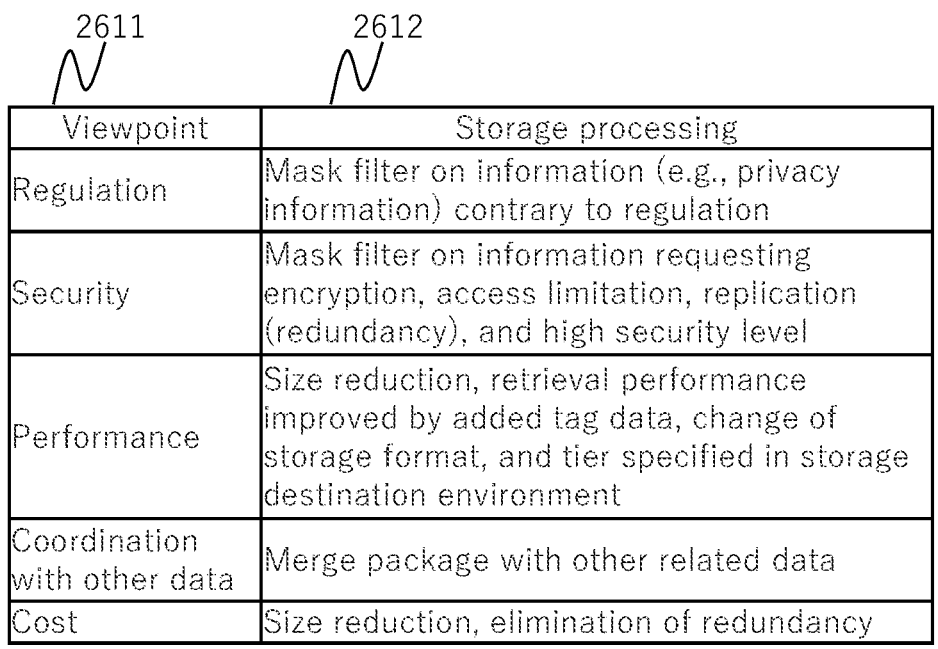
FIG. 15 illustrates an example of a processing template.

FIG. 15 illustrates an example of the processing template 261. The processing template 261 in FIG. 15 includes fields 2611 and 2612. The field 2611 stores a viewpoint name. The field 2612 stores a processing name that indicates storage processing performed if a viewpoint name belongs to a bottleneck viewpoint. FIG. 15 indicates an example of storage processing. Actually, storage processing for the viewpoints varies depending on the operation management SW 122 and a physical resource.

Figure 16:
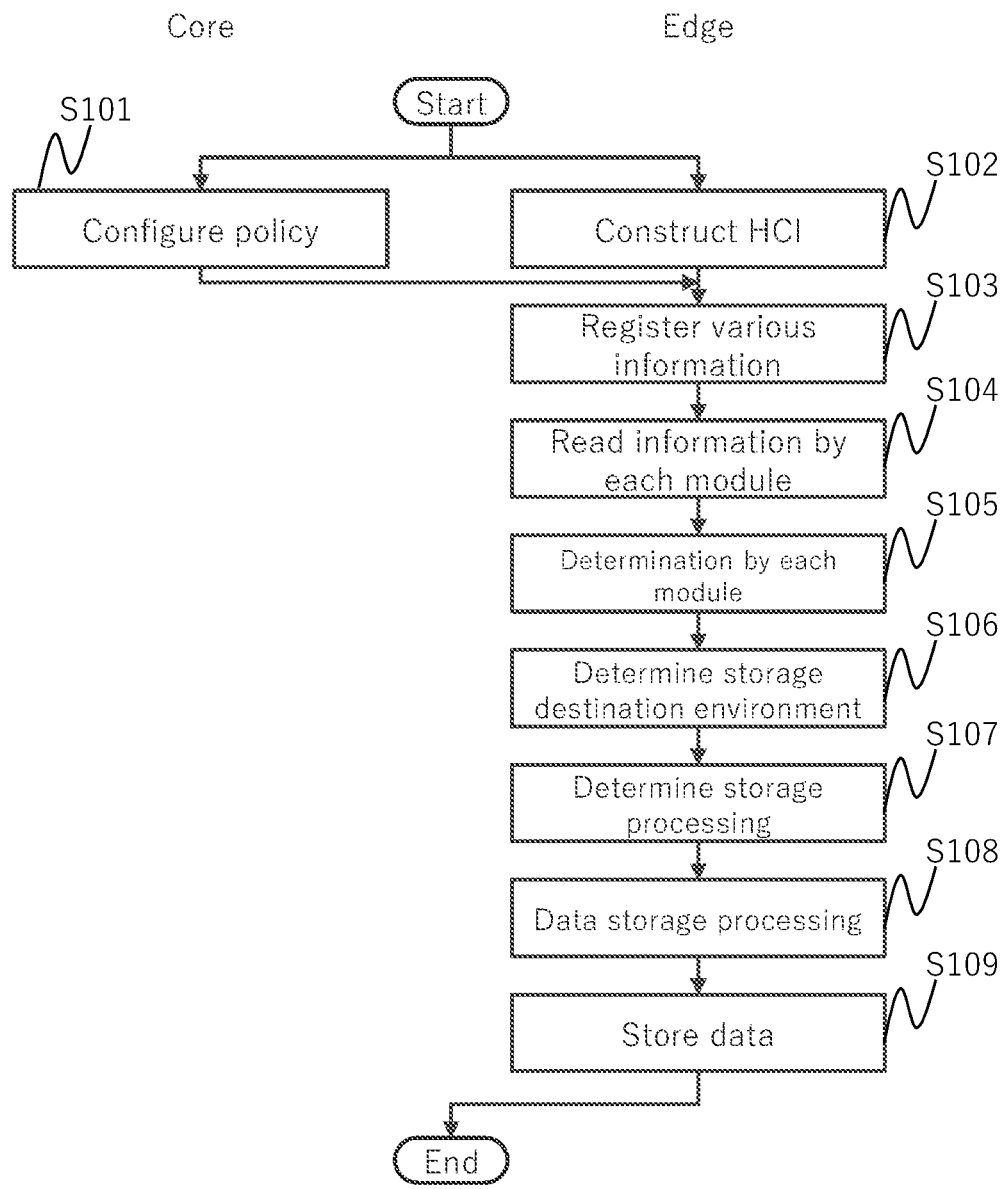
FIG. 16 is a flowchart for explaining an example of the overall operation of the edge core system.

FIG. 16 is a flowchart for explaining an example of the overall operation of the edge core system 10.

First, in the core, the policy table set 202 and the processing template 261 are configured (step S101). In the present embodiment, the policy table set 202 and the processing template 261 are configured in the on-premise system 4 and are stored in, for example, the client PC 33 of the on-premise system 4.

In the edge, the HCI 13 is constructed in the HCI server 100 (step S102). The used-data table set 201 is configured for the orchestration SW 123, and the policy table set 202 and the processing template 261 are read (step S103). Thereafter, the modules 231 to 236 of the data-storage-destination environment-determination module set 203 read necessary information (step S104).

Thereafter, at the timing for writing data in any one of the storage environments, the modules 231 to 235 of the data-storage-destination environment-determination module set 203 determine, from the respective viewpoints, the conformity of each storage environment serving as a storage destination of target data to be stored (step S105). The timing for writing is, for example, the timing of the generation of a write request. The target data is, for example, data requested to be written in response to the write request.

The environment determination module 236 then determines the storage destination environment of target data based on the determination results of the modules 231 to 235 (step S106).

The storage-processing determination module 204 determines storage processing to be performed on target data based on the determination results of the modules 231 to 235 (step S107). The processing module 206 performs the storage processing determined by the storage-processing determination module 204 (step S108).

The data migration module 207 transmits target data, which has been subjected to the storage processing, to the storage destination environment determined by the environment determination module 236 and stores the target data in the environment (step S109), which completes the processing.

The storage destination environment is determined for each type of data. Thus, if generated target data is the same type as target data for which the storage destination environment has been determined, steps S106 and S107 may be skipped.

Figure 17:
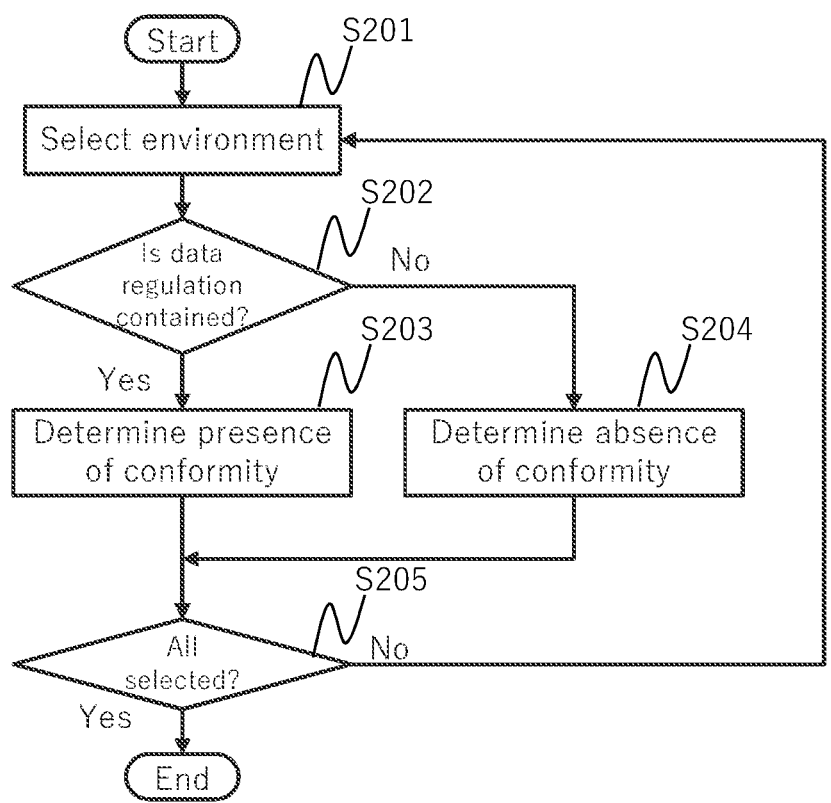
FIG. 17 is a flowchart for explaining an example of processing performed by a regulation-viewpoint determination module.

FIG. 17 is a flowchart for explaining an example of processing performed by the regulation-viewpoint determination module 231 in step S105 of FIG. 16. In step S104, the regulation-viewpoint determination module 231 acquires an environment regulation, which is applied to each environment, from the environment management table 211, and acquires a data regulation, which is applied to target data (hereinafter configuration scan data), from the data management table 212.

First, the regulation-viewpoint determination module 231 selects any one of environments for which conformity has not been determined (step S201). The regulation-viewpoint determination module 231 determines whether a selected environment regulation, which is an environment regulation applied to a selected environment, which has been selected, contains a target data regulation, which is a data regulation of target data (step S202).

In this case, if the selected environment regulation is satisfied so as to meet the target data regulation, the regulation-viewpoint determination module 231 determines that the selected environment regulation contains the target data regulation.

If the selected environment regulation contains the target data regulation, the regulation-viewpoint determination module 231 determines that the selected environment has conformity as a storage destination of target data, and updates the conformity of the selected environment in the regulation conformity table 2511 of target data to "1" (step S203). If the selected environment regulation does not contain the target data regulation, the regulation-viewpoint determination module 231 determines that the selected environment does not have conformity as a storage destination of target data, and updates the conformity of the selected environment in the regulation conformity table 2511 of target data to "0" (step S204).

After updating the conformity, the regulation-viewpoint determination module 231 determines whether all the environments have been selected or not (step S205). If all the environments have been selected, the regulation-viewpoint determination module 231 completes the processing. If all the environments have not been selected, the regulation-viewpoint determination module 231 returns to the processing of step S201.

Figure 18:
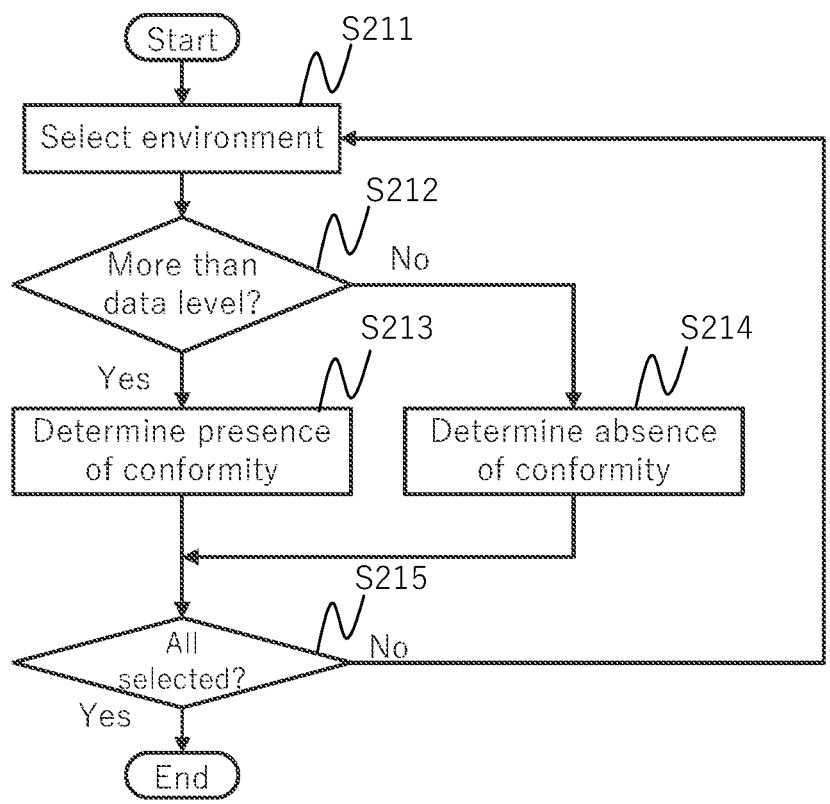
FIG. 18 is a flowchart for explaining an example of processing performed by a security-viewpoint determination module.

FIG. 18 is a flowchart for explaining an example of processing performed by the security-viewpoint determination module 232 in step S105 of FIG. 16. In step S104, the security-viewpoint determination module 232 acquires an environment level, which is a security level applied to each environment, from the environment management table 211, and acquires a target data level, which is a security level applied to target data, from the data management table 212.

First, the security-viewpoint determination module 232 selects any one of environments for which conformity has not been determined (step S211). The security-viewpoint determination module 232 determines whether a selected environment level, which is the environment level of the selected environment, is equal to or higher than the target data level (step S212).

If the selected environment level is equal to or higher than the target data level, the security-viewpoint determination module 232 determines that the selected environment has conformity as a storage destination of target data, and updates the conformity of the selected environment in the security conformity table 2512 of target data to "1" (step S213). If the selected environment level is lower than the target data level, the security-viewpoint determination module 232 determines that the selected environment does not have conformity as a storage destination of target data, and updates the conformity of the selected environment in the security conformity table 2512 of target data to "0" (step S214).

After updating the conformity, the security-viewpoint determination module 232 determines whether all the environments have been selected or not (step S215). If all the environments have been selected, the security-viewpoint determination module 232 completes the processing. If all the environments have not been selected, the security-viewpoint determination module 232 returns to the processing of step S211.

Figure 19:
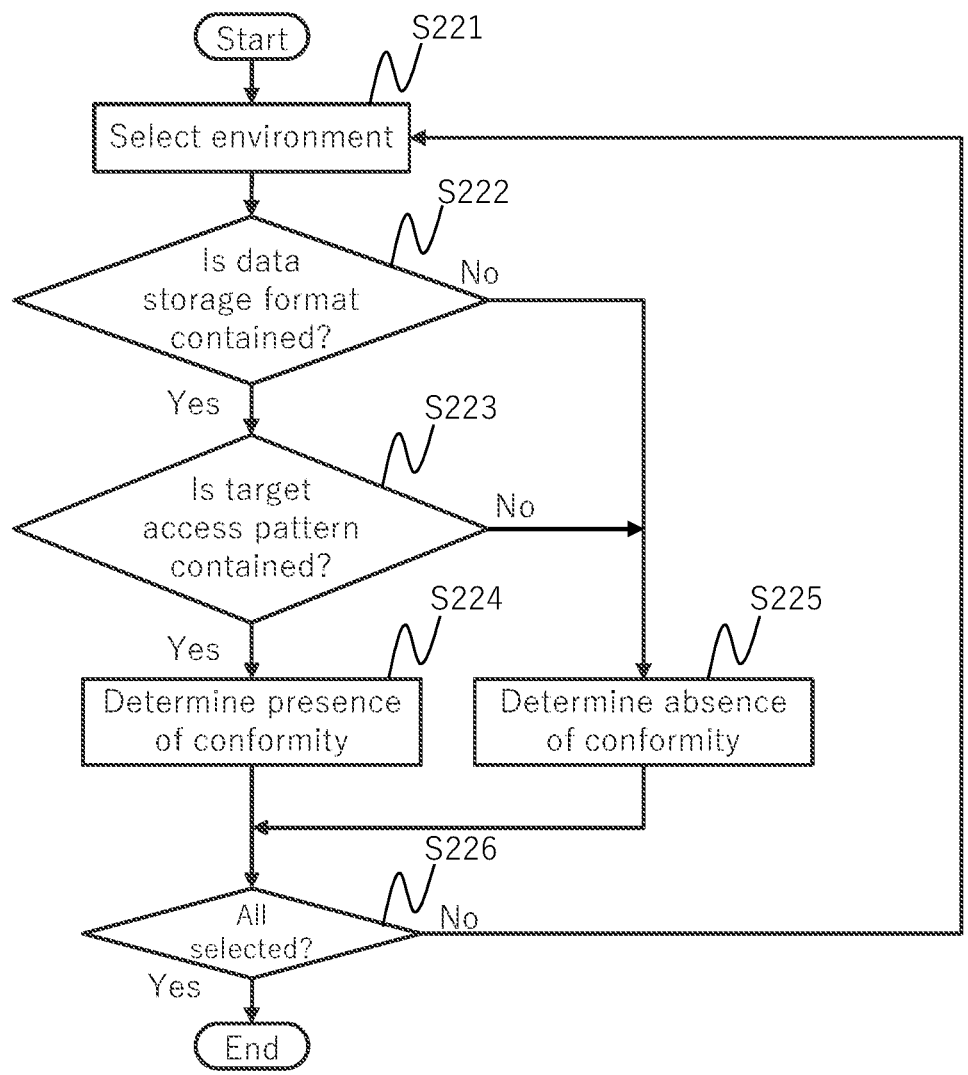
FIG. 19 is a flowchart for explaining an example of processing performed by a performance-viewpoint determination module.

FIG. 19 is a flowchart for explaining an example of processing performed by the performance-viewpoint determination module 233 in step S105 of FIG. 16. In step S104, the performance-viewpoint determination module 233 acquires a corresponding storage format and a corresponding access pattern, which are applied to each environment, from the environment management table 211, and acquires a data storage format and an access pattern, which are applied to target data, from the data management table 212.

First, the performance-viewpoint determination module 233 selects any one of environments for which conformity has not been determined (step S221). The performance-viewpoint determination module 233 determines whether a selected storage format, which is the corresponding storage format of the selected environment, contains a target storage format, which is a data storage format of target data (step S222).

If the selected storage format contains the target storage format, the performance-viewpoint determination module 233 determines whether a selected access pattern, which is the corresponding access pattern of the selected environment, contains a target access pattern, which is an access pattern of target data (step S223).

If the selected access pattern contains the target access pattern, the performance-viewpoint determination module 233 determines that the selected environment has conformity as a storage destination of target data, and updates the conformity of the selected environment in the performance conformity table 2513 of target data to "1" (step S224).

If the selected access pattern contains the target access pattern, the performance-viewpoint determination module 233 determines that the selected environment has conformity as a storage destination of target data, and updates the conformity of the selected environment in the performance conformity table 2513 of target data to "0" (step S225).

After updating the conformity, the performance-viewpoint determination module 233 determines whether all the environments have been selected or not (step S226). If all the environments have been selected, the performance-viewpoint determination module 233 completes the processing. If all the environments have not been selected, the performance-viewpoint determination module 233 returns to the processing of step S221.

Figure 20:
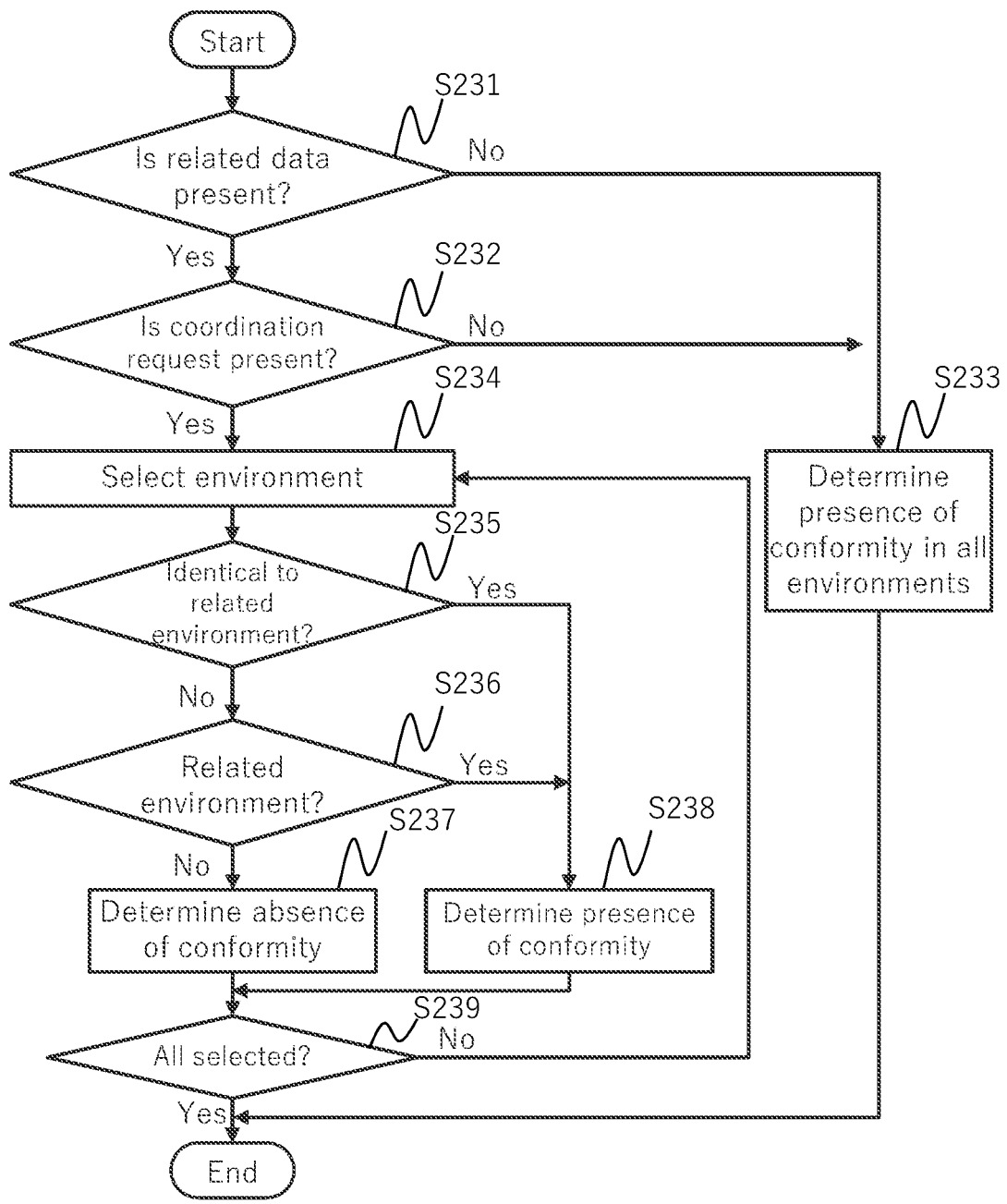
FIG. 20 is a flowchart for explaining an example of processing performed by a relationship-viewpoint determination module.

FIG. 20 is a flowchart for explaining an example of processing performed by the relationship-viewpoint determination module 234 in step S105 of FIG. 16. In step S104, the relationship-viewpoint determination module 234 acquires a coordinated environment, which is applied to each environment, from the environment management table 211, and acquires related data of target data, a coordination request, and a related environment from the data management table 212.

First, the relationship-viewpoint determination module 234 determines the presence or absence of related data that is another data accessed in the corresponding operation of access to target data (step S231).

In the presence of related data, the relationship-viewpoint determination module 234 determines the presence or absence of a coordination request of target data and the related data (step S232).

In the absence of related data and a coordination request, the relationship-viewpoint determination module 234 determines that all the environments have conformity as a storage destination of target data, and updates the conformity of all the environments in the relationship conformity table 2514 of target data to "1" (step S233). Thereafter, the relationship-viewpoint determination module 234 completes the processing.

In the presence of a coordination request, the relationship-viewpoint determination module 234 selects any one of environments for which conformity has not been determined (step S234).

The relationship-viewpoint determination module 234 determines whether the selected environment is identical to the related environment for storing the related data (step S235).

If the selected environment is not identical to the related environment, the relationship-viewpoint determination module 234 determines whether the selected environment is a coordinated environment that can be directly coupled to the related environment (step S236).

If the selected environment is not a coordinated environment, the relationship-viewpoint determination module 234 determines that the selected environment does not have conformity as a storage destination of target data, and updates the conformity of the selected environment in the relationship conformity table 2514 of target data to "0" (step S237).

If the selected environment is identical to the related environment and the selected environment is a coordinated environment, the relationship-viewpoint determination module 234 determines that the selected environment has conformity as a storage destination of target data, and updates the conformity of the selected environment in the relationship conformity table 2514 of target data to "1" (step S238).

After updating the conformity, the relationship-viewpoint determination module 234 determines whether all the environments have been selected or not (step S239). If all the environments have been selected, the relationship-viewpoint determination module 234 completes the processing. If all the environments have not been selected, the relationship-viewpoint determination module 234 returns to the processing of step S234.

Figure 21:
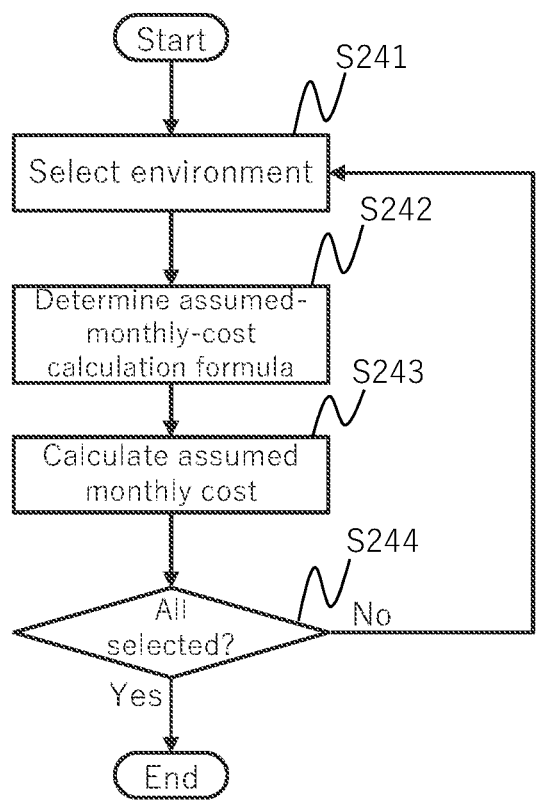
FIG. 21 is a flowchart for explaining an example of processing performed by a cost calculation module.

FIG. 21 is a flowchart for explaining an example of processing performed by the cost calculation module 235 in step S105 of FIG. 16. In step S104, the cost calculation module 235 acquires an accounting system, which is applied to each environment, from the environment management table 211, and acquires the frequency of access and the data size of target data from the data management table 212.

First, the cost calculation module 235 selects any one of environments for which conformity has not been determined (step S241).

The cost calculation module 235 determines an assumed-monthly-cost calculation formula for calculating assumed monthly cost that indicates the conformity of the selected environment for cost with target data, based on the accounting system of the selected environment (step S242).

The assumed-monthly-cost calculation formula is, for example, monthly storage cost+monthly communication cost. The monthly storage cost is data size×environment flat rate X while the monthly communication cost is (data size×read frequency×environment flat rate Y)+(data size× write frequency×environment flat rate Z). The read frequency is the access frequency of an access pattern "Read" while the write frequency is the access frequency of an access pattern "Write." Moreover, the environment flat rate X is storage cost in the accounting system, the environment flat rate Y is the communication cost of the access pattern "Read" in the accounting system, and the environment flat rate Z is the communication cost of the access pattern "Write" in the accounting system.

The cost calculation module 235 substitutes the data size and the frequency of access of target data into the assumed-monthly-cost calculation formula, calculates the assumed monthly cost, and updates the monthly cost of the selected environment in the cost table 252 of target data to the assumed monthly cost (step S243).

Subsequently, the cost calculation module 235 determines whether all the environments have been selected or not (step S244). If all the environments have been selected, the cost calculation module 235 completes the processing. If all the environments have not been selected, the cost calculation module 235 returns to the processing of step S241.

Figure 22:
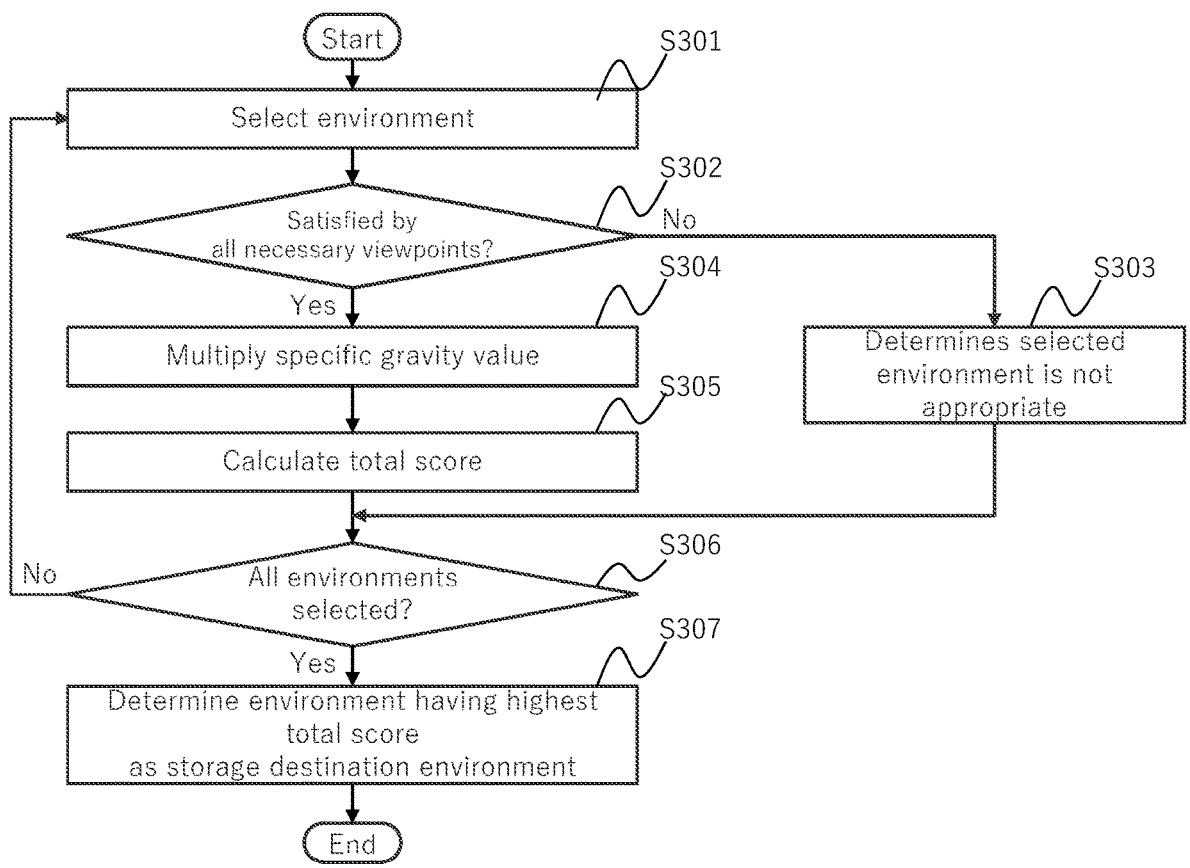
FIG. 22 is a flowchart for more specifically explaining processing performed by an environment determination module.

FIG. 22 is a flowchart for explaining an example of processing performed by the environment determination module 236 in step S106 of FIG. 16. In step S104, the environment determination module 236 acquires conformity about viewpoints other than cost from the environment conformity table 251, acquires monthly cost, which is conformity about cost, from the cost table 252, and generates the conformity/cost table 253 based on the conformity. Moreover, the environment determination module 236 acquires the weighting table 221 and the cost threshold table 222.

First, the environment determination module 236 selects any one of environments for which conformity has not been (step S301).

The environment determination module 236 determines whether the predetermined conditions are satisfied by all necessary viewpoints, which are "Must" in the weighting table 221, in the selected environment (step S302). In this, the predetermined conditions are that the conformity indicates "1" concerning the viewpoints other than cost and are that monthly cost serving as conformity about cost is equal to or lower than a threshold indicated in the cost threshold table 222 concerning the cost.

If one of the necessary viewpoints does not satisfy the predetermined conditions, the environment determination module 236 determines that the selected environment is not appropriate as a storage destination environment of target data (step S303).

If any of the necessary viewpoints does satisfy the predetermined conditions, the environment determination module 236 multiplies the value of the conformity of each viewpoint by the specific gravity value of each viewpoint of the weighting table 221 (step S304) and calculates, as a total score, the total of the values multiplied by the specific gravity values, thereby calculating the weighting sum of the values of conformity for the viewpoints (step S305).

After the completion of step S303 or S305, the environment determination module 236 determines whether all the environments have been selected or not (step S306). If all the environments have not been selected, the environment determination module 236 returns to the processing of step S301.

If all the environments have been selected, the environment determination module 236 determines, as a storage destination environment of target data, the environment having the highest total score from among the environments that are not inappropriate, and adds the target data and the storage destination environment, which are associated with each other, to the data-storage-destination environment table 254 (step S307). Thereafter, the environment determination module 236 completes the processing.

Figure 23:
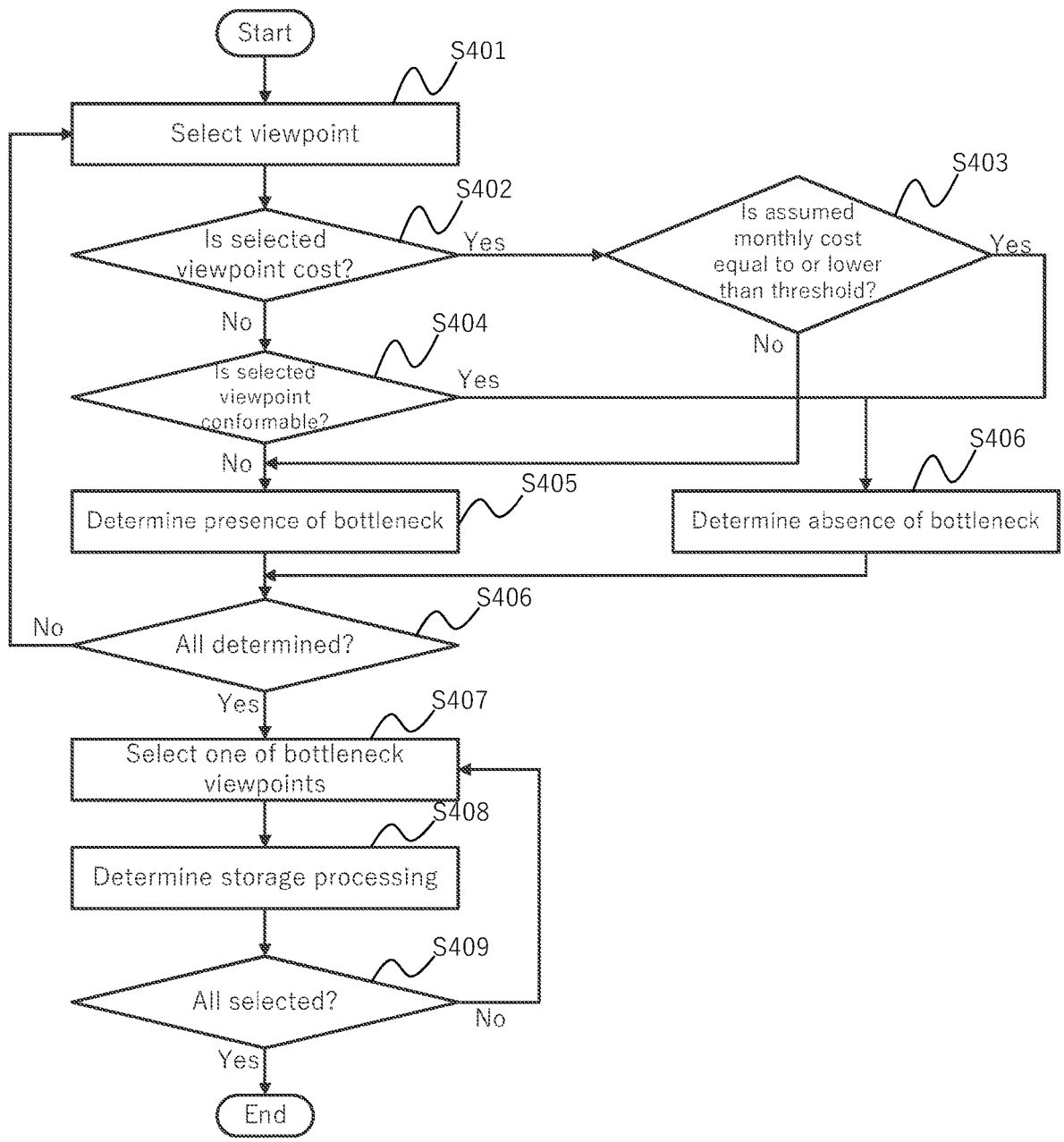
FIG. 23 is a flowchart for explaining an example of processing performed by a storage-processing determination module.

FIG. 23 is a flowchart for explaining an example of processing performed by the storage-processing determination module 204 in step S108 of FIG. 16. In step S104, the storage-processing determination module 204 acquires the cost threshold table 222, the conformity/cost table 253, the data-storage-destination environment table 254, and the processing template 261.

First, the storage-processing determination module 204 selects any one of viewpoints for which a bottleneck has not been determined (step S401). The storage-processing determination module 204 determines whether the selected viewpoint is cost (step S402).

If the selected viewpoint is cost, the storage-processing determination module 204 determines whether monthly cost indicating conformity about the cost of a storage destination environment is equal to or lower than the threshold indicated in the cost threshold table 222, thereby determining whether the conformity about cost satisfies the good conditions (step S403). If the monthly cost is equal to or lower than the threshold, the storage-processing determination module 204 determines that the conformity about cost satisfies the good conditions. If the monthly cost is higher than the threshold, the storage-processing determination module 204 determines that the conformity about cost does not satisfy the good conditions.

If the selected viewpoint is not cost, the storage-processing determination module 204 determines whether the conformity of a storage destination environment from the selected viewpoint is "1", thereby determining whether conformity about the selected viewpoint satisfies the good conditions (step S404). If the conformity about the selected viewpoint indicates "1", the storage-processing determination module 204 determines that the conformity about cost satisfies the good conditions. If the conformity about the selected viewpoint indicates "0", the storage-processing determination module 204 determines that the conformity about the selected viewpoint does not satisfy the good conditions.

If the good conditions are not satisfied, the storage-processing determination module 204 determines that the selected viewpoint is a bottleneck viewpoint and updates the bottleneck determination result of the selected viewpoint in the policy-compliant state table 255 to "present" (step S405). If the good conditions are satisfied, the storage-processing determination module 204 determines that the selected viewpoint is not a bottleneck viewpoint and updates the bottleneck determination result of the selected viewpoint in the policy-compliant state table 255 to "absent" (step S406).

After the policy-compliant state table 255 is updated, the storage-processing determination module 204 selects any one of viewpoints for which storage processing has not been determined, from among bottleneck viewpoints based on the policy-compliant state table 255 (step S407). The storage-processing determination module 204 determines storage processing corresponding to the selected viewpoint from the processing template 261 and updates the storage processing table 256 based on the determination result (step S408).

The storage-processing determination module 204 determines whether all bottleneck viewpoints have been selected (step S409). If all the bottleneck viewpoints have been selected, the storage-processing determination module 204 completes the processing. If all the bottleneck viewpoints have not been selected, the storage-processing determination module 204 returns to the processing of step S407.

As described above, according to the present embodiment, the data-storage-destination environment-determination module set 203 determines any one of the storage environments as a storage destination environment for storing data, based on the used-data table set 201 about the characteristics of data and the storage environments. The data migration module 207 transmits data to the storage destination environment. This can store data in a storage destination environment, which is a proper storage environment from among the multiple storage environments, according to the characteristics of data and the storage environments, thereby efficiently using the multiple storage environments.

In the present embodiment, the data-storage-destination environment-determination module set 203 determines the conformity of the storage environments serving as data storage destinations and determines the storage destination environment based on the conformity of the storage environments. Thus, the storage destination environment can be more properly determined.

In the present embodiment, the data-storage-destination environment-determination module set 203 determines the conformity of the viewpoints. Thus, the storage destination environment can be more properly determined.

In the present embodiment, the data-storage-destination environment-determination module set 203 determines the storage destination environment based on the weighting sum of the values of conformity for the viewpoints. Thus, the storage environment with high conformity with the important viewpoint is selected as a storage destination environment, enabling more proper determination of the storage determination environment.

In the present embodiment, the data-storage-destination environment-determination module set 203 determines a storage destination environment from among storage environments where the predetermined conditions are satisfied by conformity for predetermined necessary viewpoints of the viewpoints. Since the storage destination environment is determined from the storage environment where the necessary conditions are satisfied, the storage destination environment can be more properly determined.

In the present embodiment, the processing module 206 performs data processing on data from the viewpoints for which conformity does not satisfy the predetermined good conditions in the storage destination environment. This can reduce inconvenience caused by conformity that does not satisfy the good conditions.

In the present embodiment, the storage environment includes an edge environment provided for the edge system 1 and a core environment provided for the core system coupled to the edge system 1 via the network. Thus, the edge environment can be efficiently used.

In the present embodiment, multiple core environments are provided and thus can be efficiently used.

In the present embodiment, at least part of the policy for determining the storage destination environment is read from the core environment. Thus, the policy can be properly configured.

The embodiment of the present disclosure is merely an example for explaining the present disclosure. The present disclosure is not intended to be limited to the embodiment. A person skilled in the art can implement the present disclosure in other various forms without departing from the scope of the present disclosure.

What is claimed is:

1. An information processor coupled to a plurality of storage environments capable of storing data, the information processor comprising:
a processor configured to determine any of the plurality of storage environments as a storage destination environment for storing the data, based on management information on characteristics of i) the data and ii) each of the plurality of storage environments, the processor determines conformity, i) with respect to each of the plurality of storage environments serving as storage destinations of the data and ii) with respect to a plurality of viewpoints, based on the management information, and determines the storage destination environment based on the conformity;

the processor configured to transmit the data to the storage destination environment; and the processor configured to perform data processing on the data in accordance with the plurality of viewpoints for which the conformity, of one of the plurality of storage environments, does not satisfy predetermined conditions in the storage destination environment, wherein the processor transmits the data that has been subjected to the data processing.

2. The information processor according to claim 1, wherein the processor determines the storage destination environment, based on a weighted sum of a plurality of values in accordance with of the conformity, of one or more of the plurality of storage environments, corresponding to each of the plurality of viewpoints.

3. The information processor according to claim 1, wherein the processor determines the storage destination environment from a first subset of the plurality of storage environments wherein predetermined conditions are satisfied by the conformity, of the first subset, corresponding to a predetermined necessary viewpoint among the plurality of viewpoints.

4. The information processor according to claim 1, wherein the plurality of storage environments includes an edge environment comprising an edge system configured to collect the data from a device, in which the data is generated, and a core environment comprising a core system coupled to the edge system via a network.

5. The information processor according to claim 4, wherein the core environment is provided in plurality.

6. The information processor according to claim 4, wherein the information processor is provided in the edge system, and the processor reads at least part of a policy for determining the storage destination environment, from the core environment.

7. A data control method executed by an information processor coupled to a plurality of storage environments capable of storing data, the method comprising:

determining any of the plurality of storage environments as a storage destination environment for storing the data, based on management information on characteristics of i) the data and ii) each of the plurality of storage environments;

determining conformity, i) with respect to each of the plurality of storage environments serving as storage destinations of the data and ii) with respect to a plurality of viewpoints, based on the management information, and determining the storage destination environment based on the conformity;

transmitting the data to the storage destination environment; and performing data processing on the data in accordance with the plurality of viewpoints for which the conformity, of one of the plurality of storage environments, does not satisfy predetermined conditions in the storage destination environment, transmitting the data that has been subjected to the data processing.

8. A non-transitory and tangible computer-readable recording medium in which a program to be executed by a computer coupled to a plurality of storage environments is recorded, the program causing the computer to perform procedures of:

determining any of the plurality of storage environments as a storage destination environment for storing the data, based on management information on characteristics of i) the data and ii) each of the plurality of storage environments;

determining conformity, i) with respect to each of the plurality of storage environments serving as storage destinations of the data and ii) with respect to a plurality of viewpoints, based on the management information, and determining the storage destination environment based on the conformity;

transmitting the data to the storage destination environment; and performing data processing on the data in accordance with the plurality of viewpoints for which the conformity, of one of the plurality of storage environments, does not satisfy predetermined conditions in the storage destination environment, transmitting the data that has been subjected to the data processing.

\* \* \* \* \*